STABILIZED MIXER OSCILLATOR FOR WIDE BAND TELEVISION RECEIVER

Filed Jan. 23, 1964 4 Sheets-Sheet 1

Dec. 5, 1967 A. SEV 3,356,952

STABILIZED MIXER OSCILLATOR FOR WIDE BAND TELEVISION RECEIVER

Filed Jan. 23, 1964 4 Sheets-Sheet 2

United States Patent Office 3,356,952

Patented Dec. 5, 1967

3,356,952

STABILIZED MIXER OSCILLATOR FOR WIDE BAND TELEVISION RECEIVER

Alexandre Sev, Paris, France, assignor to CSF-Compagnie Generale de Telegraphie Sans Fil, a corporation of France Filed Jan. 23, 1964, Ser. No. 339,655
Claims priority, application France, Jan. 25, 1963, 922,699
4 Claims. (Cl. 325—459)

ABSTRACT OF THE DISCLOSURE

A transistorized tuner for television receiver comprises a transistorized mixer oscillator, having a stabilized output level. To this end, the oscillation level, in the lower part of the frequency range concerned, is raised by means of capacitive coupling between the tuned line of the collector circuit, and the emitter circuit of the transistor. In the upper part of the frequency range, the oscillation level is raised by a magnetic coupling.

The present invention relates to transistorized ultra-high frequency receivers, and more particularly to ultra-high frequency amplifier converters, generally called "tuners" intended, for example, for television reception in bands IV and V.

As well known in the art a low-cost ultra-high-frequency amplifier-converter generally comprises two stages:

An ultra-high frequency amplifier stage generally of the common base type;

A mixer-oscillator stage fed from the former stage and delivering an intermediate frequency signal to the intermediate frequency amplifier.

A correct operation of the mixer-oscillator calls for a level of oscillations sufficient to obtain satisfactory conversion gain and noise-factor. However, the oscillation must not be too strong in order that the reinjection in antenna circuits should not be too strong.

This oscillation level can be readily adjusted to the required value, whatever the mode of coupling used, whether capacitive or inductive, when the oscillation frequency is fixed, or varies within narrow limits.

But the situation is quite different in ultra high frequency tuning circuits of the television receivers, for example when television frequency bands IV and V (435 to 825 mHz.) are to be covered in addition to frequency band I and III (40 to 210 mHz.).

The oscillators of known types, covering the frequency range between 435 and 825 mcs. show generally considerable level variations and are ill suited for covering frequency bands IV and V.

On the other hand, the common base amplifier can disturb the operation of the receiver due to its instability.

It is an object of the invention to provide a stabilized output level transistorized mixer oscillator. To this end, the oscillation level in the lower part of the frequency range concerned, is raised by means of capacitive coupling between the tuned line circuit of the collector and the emitter circuit of the transistor of said stage.

The invention on the other hand provides means to improve the stabiltiy of the ultra-high-frequency transistorized common base amplifier by stabilizing the output voltage of the output connection of the transistor.

The invention will be best understood from the following description and appended drawing wherein:

FIG. 1 is a diagram of one embodiment of an ultra-high-freqnency tuner according to the invention.

Figure 1:
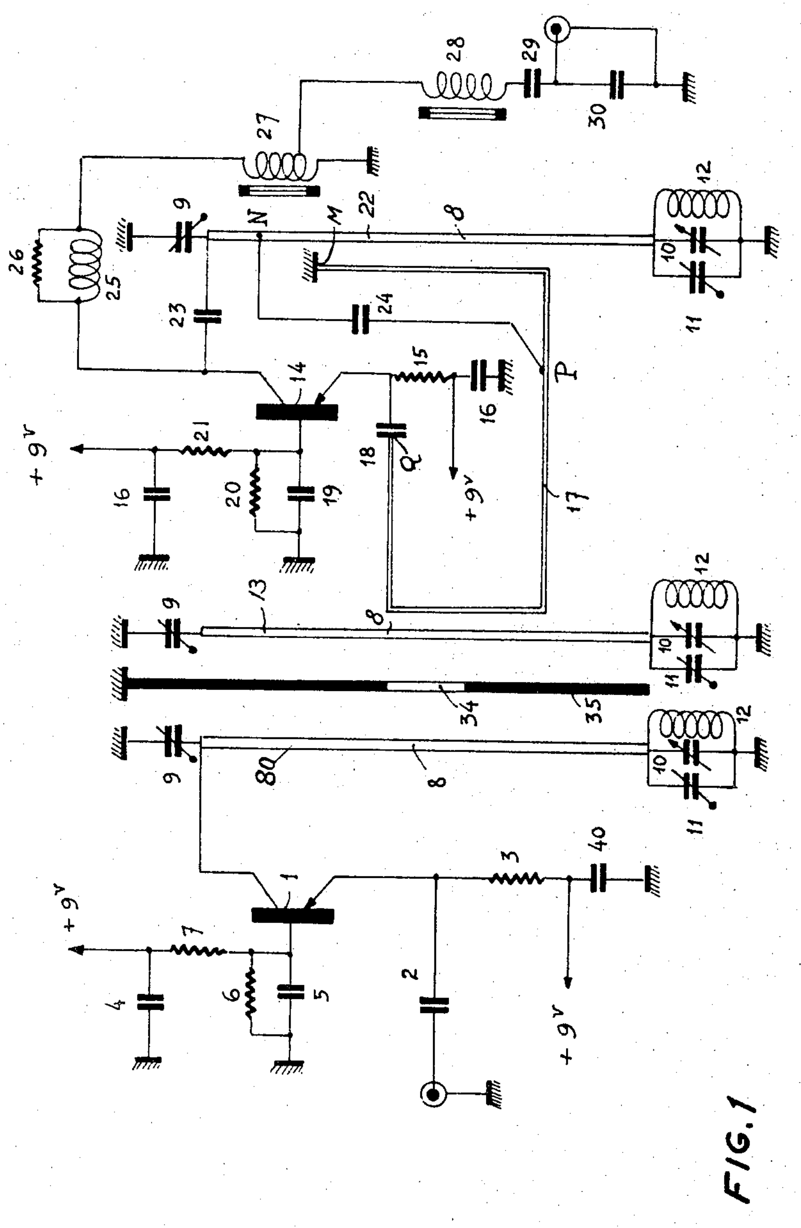
FIG. 1 is a diagram of one embodiment of an ultra-high frequency tuner amplifier according to *a* the invention.

An ultra-high-frequency amplifier transistor 1 mounted with a common base, is connected to an input capacitor 2.

The base of transistor 1 is grounded through a capacitor 5. The bias potential of the base is determined by the bridge of resistances 6 and 7.

The emitter circuit comprises a resistor 3 and a capacitor 40.

The tuned circuit of the collector is of a conventional line type, as used in tube equipped tuners. It comprises a tuned line 80, one end of which is terminated by an adjustable capacitor 9. The other end of line 80 is terminated by a variable capacitor 10, an adjustable capacitor 11 and an inductance coil 12, in parallel.

This tuned circuit is magnetically coupled, by means of the coupling window 34 managed in a shield 35, to a further tuned circuit 13, similar to it. Line 13 is coupled by means of a loop 17 to the emitter circuit of the mixer oscillator transistor 14.

The emitter of this transistor is biased, for example by means of a source of D.C. voltage of 9 volts, connected to a bridge between the emitter and ground and comprising a resistor 15 and a by-pass capacitor 16. Loop 17 drives the emitter through a capacitor 18 of about 100 pf. and is also magnetically coupled to the collector tuned circuit 22, comprising a line and tuning elements similar to those of circuits 80 and 13. One end of line 22 is connected to collector 14 by means of a capacitor 23 of a few picofarads.

A small capacitor 24 of a few picofarads, connecting a point P of loop 17 to a point N of line 22 provides an additional capacitive coupling between the tuned circuit 22 and the emitter circuit.

The base is grounded through a capacitor 19 and is connected to a D.C. source of, for example, 9 volts through a resistor 21, whose terminals are grounded respectively through a capacitor 16 and a resistor 20.

The collector circuit is completed by elements intended for directing the intermediate frequency signal to the output of the "tuner."

Those elements comprise essentially an ultra-high-frequency choke coil 25, shunted by a resistor 25, an intermediate frequency tuning coil 27, a tuning coil 28, a tuning capacitor 29, and a coupling capacitor 30.

Figures 2, 4:
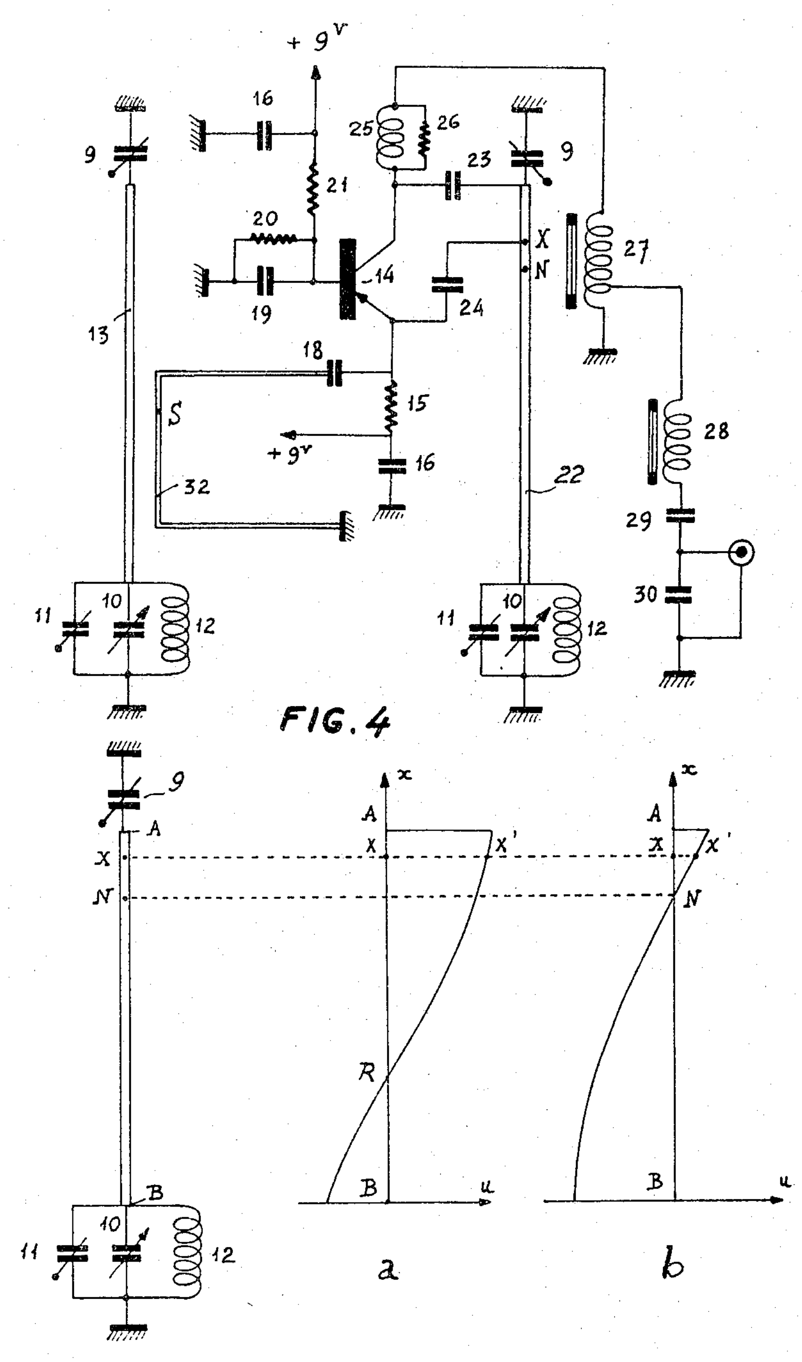
FIG. 2 shows two diagrams *a* and *b* of voltages along the line of a tuned circuit respectively corresponding to the lower and the higher frequencies of the range considered.
FIGS. 3, 4 and 5 show modifications.

The selection of point N on line 22 is explained by the voltage diagrams *a* and *b* of FIG. 2, showing the potential distribution along the line for the lower frequencies *a* and for the higher frequencies *b* of the frequency range covered by the oscillator. The voltage node thus moves from point R to point N, whose position is defined by the node of the diagram *b*.

It is known that the capacitive coupling due to capacitor 24 is proportional to the voltage $u(x)=\overline{X'X}$ at point X of FIG. 2.

It will be seen that, under those conditions, the capacitive coupling is canceled for the higher frequencies and that its effect increases progressively with the lowering of the frequency in the covered range, while the inductive coupling behaves in an opposite manner.

Practically, it can be necessary to shift slightly the junction point of capacitor 24 with regard to the above defined nodal point N in order to take into account the spurious capacity, which may exist between the emitter and the collector of the transistor. This balancing shifting does, however, not exceed a few millimeters.

The choice of the point P of loop 17 where capacitor 24 is connected is not critical. Nevertheless it is to be made in accordance with the following considerations.

At higher frequencies the energy from the tuned circuit 22 is delivered to the emitter by means of the magnetic coupling between loop 17 and line 22. Schematically that coupling can be represented by a generator inserted into portion MP of loop 17. It may be seen that the above generator feeds the emitter circuit through a low-pass filter, the single T-cell of which is formed by the two line portions MP, i.e., from ground to point P, and PQ, i.e., between point P and capacitor 18, and capacitor 24. It is obvious that a satisfactory working at higher frequencies can be obtained only if the cut-off frequency of the above low-pass filter is sufficiently high. For that reason, length MP is generally made a little smaller than PQ and the value of capacitor 24 is reduced.

As an example, a mixer oscillator has been built with following values: capacitor 24, 1.8 pf., MP–30 mm. copper wire 10/10 mm., and PQ–50 mm. copper wire 10/10 mm. The maximum oscillating frequency of the oscillator was 2.000 mc./s.

A further object of the present invention is to improve the common base ultra-high frequency amplifier stage. It is well known that the common base arrangement is often preferred to the common emitter arrangement, because it permits, in some cases to eliminate the neutralization circuit which generally has a delicate structure and is quite expensive. Nevertheless a common base amplifier stage, when not neutralized, may be unstable.

This lack of stability is mainly due to the inductance $l$ of the transistor connection between the base and the terminal on the transistor case.

According to the present invention, it is possible to improve the stability of the common-base arrangement by connecting between base and ground a capacitor C of a suitable value so as to create a series-circuit $Cl$, resonant at a frequency F, corresponding to the maximum amplification gain of the stage. In this way, the potential of the connection of the base to the output welded to the transistor is zero at frequency F, and is reduced at other frequencies of the ultra-high frequency range concerned.

The internal self-inductance $l$ of the present day transistors is generally between 10 and 30 nanohenry. Consequently, the optimum value of the capacitor C is between 3 and 10 picofarads, with F equal to about 500 mc./s.

Stabilization capacitor 5 is shown in FIG. 1.

Figure 3:
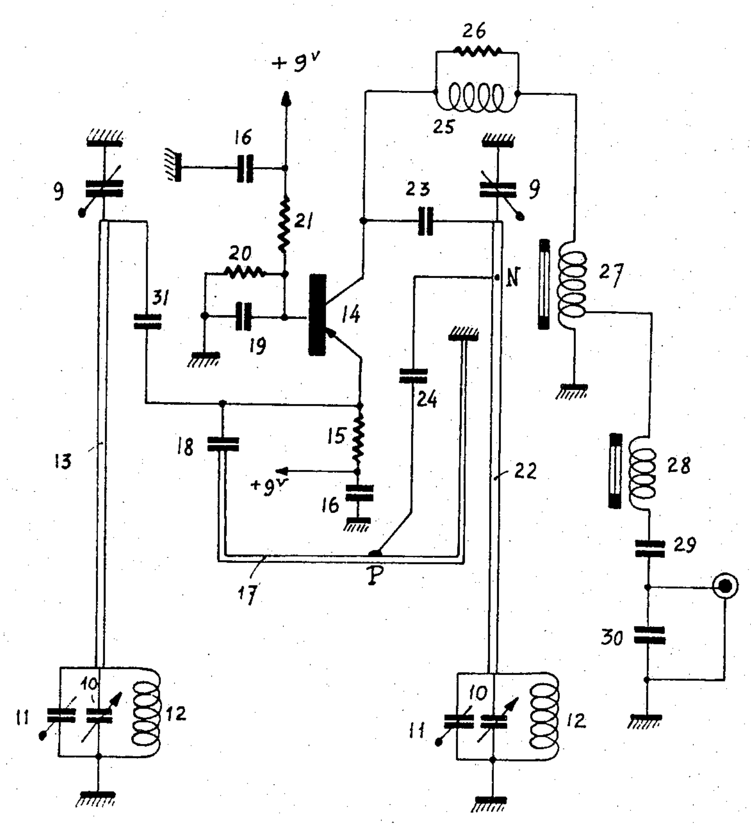

FIG. 3 shows a modification of the mixer-oscillator of FIG. 1. The tuned circuit 13 and mixer oscillator stage 14 are coupled in a different manner; loop 17 is no longer magnetically coupled to line 13; the coupling of circuit 13 to emitter is by means of a capacitor 31 of a low value (1 to 3 pf.). All the other elements on FIG. 3 are the same as on FIG. 1.

Another embodiment of a mixer oscillator according to the invention is shown in FIG. 4. The coupling between collector and emitter circuits is here, purely capacitive, capacitor 24 being the only coupling element.

Capacitor 24 is connected between emitter 14 and a point X of line 22, situated between its end connected to the collector and the above mentioned nodal point N shown in FIG. 2*b*. The value of capacitor 24 must be sufficient in order to insure a correct level of oscillations at the lower frequencies of the range considered. The value is about 1 to 3 pf. As to the oscillation level at the higher frequencies, it can be controlled by an adequate choice of point X. In diagram *b* of FIG. 2 it may be seen that, by moving point X from N towards A, the voltage at point X changes from 0 to a value $\overline{XX'}$ widely in excess of what is necessary.

In the diagram of FIG. 4 circuit 13, tuned to the frequency of the signal, is coupled to emitter 14 by a loop 32. It may be advantageous, when this is otherwise possible, to connect capacitor 24, not to the emitter, but to a point S of loop 32, which further improves the operation within the frequency range considered.

Figure 5:
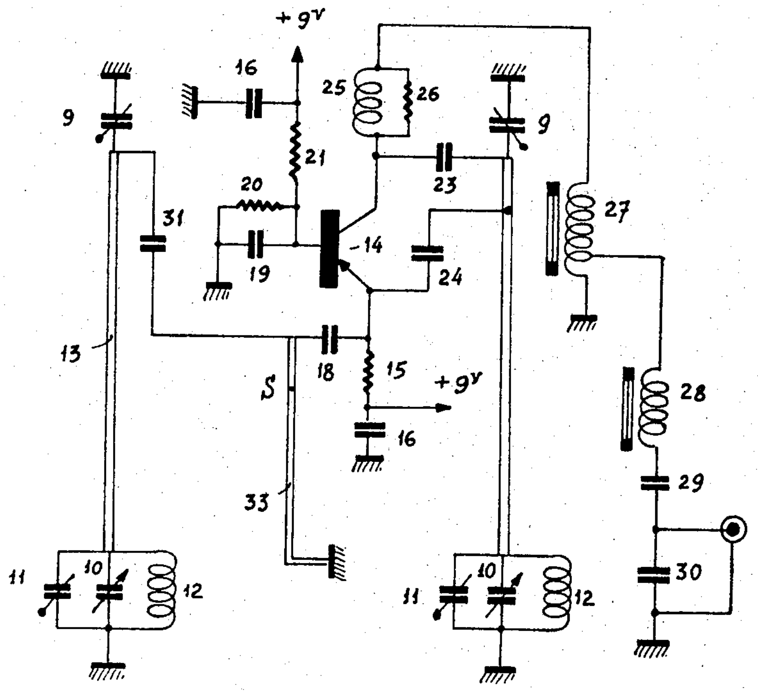

A modification of the diagram of FIG. 4, is shown in FIG. 5 wherein circuit 13, tuned to the frequency of the signal, is coupled to emitter 14 by means of a capacitor 31 in a manner somewhat similar to that used in the diagram of FIG. 3.

An inductive element 33 can be inserted in the emitter circuit. This element may be in the shape of a line portion. It can be magnetically coupled with line 13. The double coupling thus obtained between line 13 and emitter 14 makes it possible to obtain a fairly constant bandwidth in the ultra-high-frequency range considered.

Of course, the improvement to the ultra-high-frequency amplifier at the input of the mixer oscillator, which is shown on FIG. 1, may be applied to any of the modifications shown in FIGS. 3, 4 and 5.

Of course the invention is not limited to the embodiment described and shown. Thus the improvements according to the invention are not limited to the case of a television "tuners" but may be generally applied to amplifiers and oscillators working in the ultra-high-frequency range.

The same improvements are also applicable when the oscillating and mixing functions are carried out by distinct transistors.

What is claimed is:

1. A tuner comprising: a mixer oscillator transistor having an emitter circuit and a collector circuit; said collector circuit comprising a resonant line; means for magnetically coupling said emitter circuit to said line; and a capacitor for capacitively coupling said emitter circuit to said line.

2. A tuner comprising: a mixer oscillator transistor having an emitter circuit and a collector circuit; said collector circuit comprising a resonant line; means for magnetically coupling said emitter circuit to said line; and a capacitor for capacitively coupling said emitter circuit to said line, said capacitor being connected to the voltage node along said line for the higher frequencies of the frequency band of the tuner.

3. A tuner comprising: an input amplifier transistor having a collector circuit comprising a first tuned line; a second tuned line magnetically coupled to said first tuned line; a mixer oscillator transistor having an emitter circuit and a collector circuit; said collector circuit comprising a third tuned line; said emitter circuit comprising a fourth tuned line; means for magnetically coupling said emitter circuit to said second and third tuned lines; and a capacitor for capacitively coupling said emitter circuit to said third line.

4. A tuner comprising: an input amplifier transistor having a collector circuit comprising a first tuned line; a second tuned line magnetically coupled to first tuned line; a mixer oscillator transistor having an emitter circuit and a collector circuit; said collector circuit comprising a third tuned line; means for magnetically coupling said emitter circuit to said third line; and a capacitor for capacitively coupling said emitter circuit to said third line.

References Cited

UNITED STATES PATENTS 3,252,096 5/1966 Carlson ------------ 325—459

3,286,195 11/1966 Bachnick et al. ----- 334—45 X

KATHLEEN H. CLAFFY, *Primary Examiner.*

R. LINN, *Assistant Examiner.*